United States Patent
Bömoser et al.

(10) Patent No.: US 10,082,809 B2
(45) Date of Patent: Sep. 25, 2018

(54) CONTROL DEVICE AND METHOD FOR OPERATING SUCH A CONTROL DEVICE

(75) Inventors: Stefan Bömoser, Ansbach (DE); Manfred Prölss, Ebermannsdorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 903 days.

(21) Appl. No.: 14/117,199

(22) PCT Filed: May 3, 2012

(86) PCT No.: PCT/EP2012/058132
§ 371 (c)(1),
(2), (4) Date: Nov. 12, 2013

(87) PCT Pub. No.: WO2012/156207
PCT Pub. Date: Nov. 22, 2012

(65) Prior Publication Data
US 2014/0297050 A1    Oct. 2, 2014

(30) Foreign Application Priority Data

May 18, 2011    (DE) .................. 10 2011 076 045

(51) Int. Cl.
*G05F 1/00* (2006.01)
*H02B 11/02* (2006.01)
(Continued)

(52) U.S. Cl.
CPC .............. *G05F 1/00* (2013.01); *H02B 11/02* (2013.01); *H04L 41/0803* (2013.01);
(Continued)

(58) Field of Classification Search
CPC ....... G05F 1/00; H04L 41/0803; H02B 11/02; Y04S 20/227; Y04S 20/14; Y02B 90/224;
(Continued)

(56) References Cited

U.S. PATENT DOCUMENTS 3,652,911 A * 3/1972 Gorissen ............... E05F 15/689
                                                         192/131 R
4,908,792 A   3/1990 Bruckelt
(Continued)

FOREIGN PATENT DOCUMENTS

DE    3419559 A1    11/1985
DE   10304526 A1     8/2004
(Continued)

OTHER PUBLICATIONS

International Search Report PCT/ISA/210 for PCT/EP2012/058132 dated Aug. 8, 2013.
(Continued)

*Primary Examiner* — Nathan L Laughlin
(74) *Attorney, Agent, or Firm* — Harness, Dickey & Pierce, P.L.C.

(57) ABSTRACT

An embodiment relates to a control device for an electric load and to a corresponding method for operating such a control device, the control device being designed as an insert module for inserting into an insert shaft. Depending on the design, the insert shaft is provided with or without a storing device for storing configuration data and/or operating parameters of the control device or the electric load. The control device includes: a) a first device for checking whether a storing device is present or not, b) a second device for implementing the function of reading the parameters and data for operating the control device if a storing device is present, the parameters and data being stored in the storing device, and not carrying out a start-up if a storing device is not present, and c) the function of not carrying out a start-up when a storing device is not present can be deactivated.

6 Claims, 1 Drawing Sheet

(51) Int. Cl.
*H04L 12/24* (2006.01)
*H01H 71/00* (2006.01)

(52) U.S. Cl.
CPC ... *H01H 2071/006* (2013.01); *H01H 2300/03* (2013.01); *Y02B 70/3241* (2013.01); *Y02B 90/224* (2013.01); *Y04S 20/14* (2013.01); *Y04S 20/227* (2013.01)

(58) Field of Classification Search
CPC ......... Y02B 70/3241; H01H 2071/006; H01H 2300/03
See application file for complete search history.

(56) References Cited

U.S. PATENT DOCUMENTS

| | | | |
|---|---|---|---|
| 2009/0002135 A1 | 1/2009 | Bornstein | |
| 2009/0070575 A1 | 3/2009 | Ehlich | |
| 2010/0305769 A1* | 12/2010 | Jones | H01H 83/20 700/293 |
| 2011/0193690 A1 | 8/2011 | Froehlich | |
| 2011/0218680 A1* | 9/2011 | Kim | H02J 3/00 700/276 |

FOREIGN PATENT DOCUMENTS

| | | |
|---|---|---|
| DE | 10302485 A1 | 9/2004 |
| DE | 102005032075 B4 | 6/2007 |
| DE | 102007029423 A1 | 1/2009 |
| DE | 102010032033 A1 | 1/2012 |
| EP | 1950399 A1 | 7/2008 |
| EP | 2031625 A1 | 3/2009 |
| EP | 2031626 A1 | 3/2009 |

OTHER PUBLICATIONS

Written Opinion PCT/ISA/237 for PCT/EP2012/058132 dated Aug. 8, 2013.
German Office Action for priority application DE 10 2011 076 045.8 dated Apr. 20, 2012.
European Search Report dated Apr. 22, 2016.

* cited by examiner

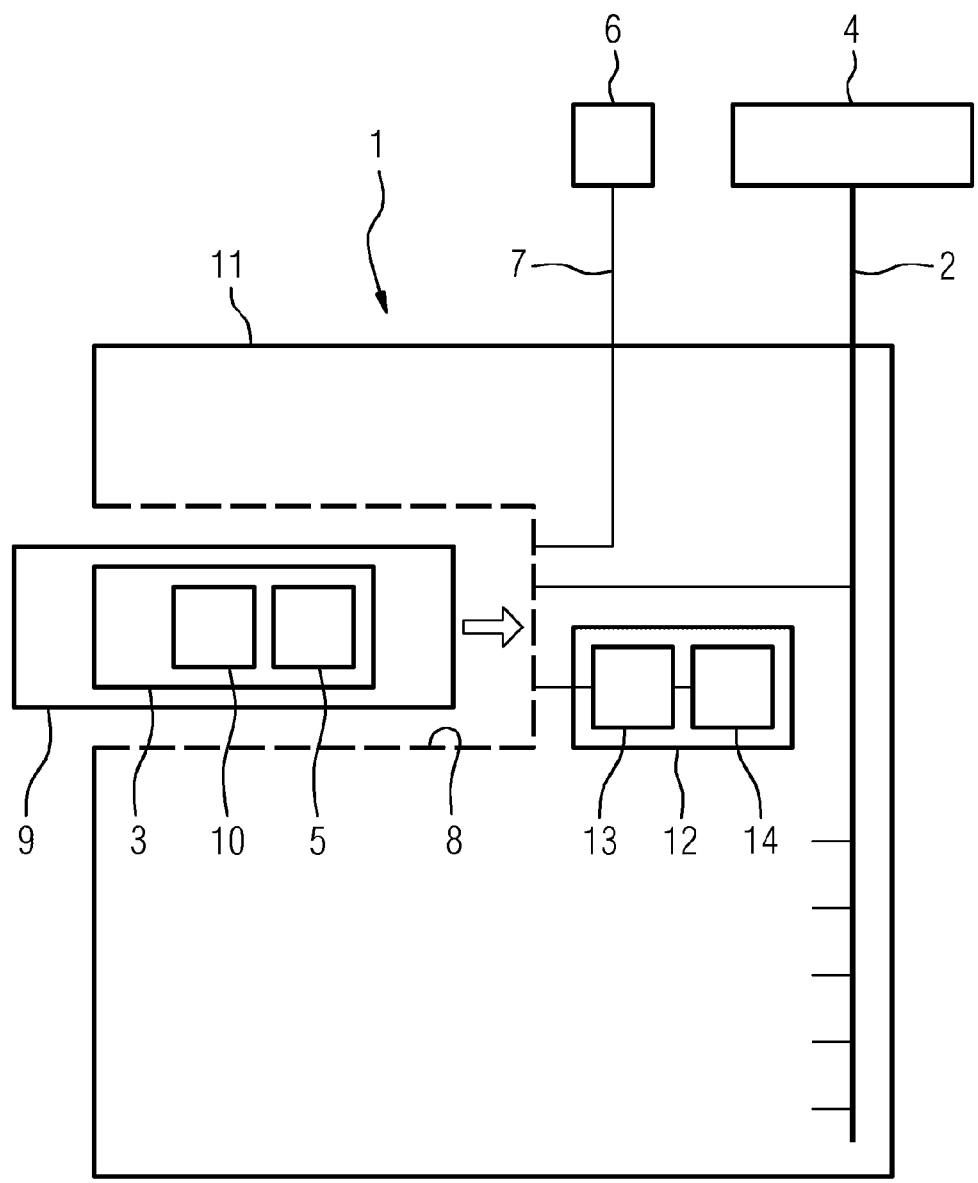

US 10,082,809 B2

CONTROL DEVICE AND METHOD FOR OPERATING SUCH A CONTROL DEVICE

PRIORITY STATEMENT

This application is the national phase under 35 U.S.C. § 371 of PCT International Application No. PCT/EP2012/058132 which has an International filing date of May 3, 2012, which designated the United States of America and which claims priority to German patent application number DE 10 2011 076 045.8 filed May 18, 2011, the entire contents of each of which are hereby incorporated herein by reference.

FIELD

At least one embodiment of the invention generally relates to a control device for an electric load, the control device being designed as an insert module for inserting into an insert shaft, e.g. a system or a device, and wherein the insert shaft, depending on design, is provided with or without with a storage device for storing configuration data and/or operating parameters of the control device or of the electric load. At least one embodiment of the invention relates to a corresponding method for operating such a control device.

BACKGROUND

Switchgears designed as withdrawable-unit systems are known from the prior art. These have inserts (insert modules) for the individual outgoing circuits, the inserts containing the corresponding protection and control devices for connected loads. These protection and control devices are increasingly integrated in a parameterizable ("smart") device, which simultaneously has a communication interface to a superordinate control system. The devices communicate via a field bus system, such as for example PROFIBUS, or another communication network that preferably operates according to the Industrial Ethernet standard, such as for example PROFINET, and are identified via a unique address within this system or network. This communication address is set up directly in the device in the form of a parameter, e.g. with the help of software.

The parameters, and therefore also the address, are stored in the device itself. Either a replaceable storage device, which is provided as load memory in addition to the actual device memory, for example in the form of a memory module, memory card, or similar, is used for this purpose, or the device is parameterized by way of software or using a so-called addressing plug. The parameters are then automatically taken over from the addressing plug or the storage device when the device is started up.

The still unpublished German patent application 10 2010 032 033.1 discloses a control device of an electrical low-voltage switchgear. When the control device, which is designed as an insert module, is pushed into the insert shaft, the configuration data and/or operating parameters of the control device or electric load that are stored in the storage device are automatically read into the control device upon contact. This ensures that an insert module or the associated control device, which may for example be an engine management system, always automatically receives the bus address and parameter data provided for this insert shaft.

It is necessary to ensure that the storage device is always read in upon activation. If there is a malfunction in the storage device or in the connection between the storage device and the control device, and the data cannot be read in, the control device must trigger a fault, e.g. "storage device not present", and is not allowed to start up.

This described function should however be used only for some of applications. For other applications, according to the current state of the art there is no storage device present and the data is stored in the control device and activated upon start-up. The data is thus assigned to the insert module and not to the insert shaft. The user must ensure, before the insert makes contact, that the correct data is loaded in the control device. The control device may not display a "storage device not present" fault in this operating mode.

SUMMARY

Embodiments of the invention are directed to a control device and a corresponding method, which enables the control device to be started up with and without a storage device.

The first object is achieved by electrical low-voltage switchgear. This control device includes:

a) the control device has a first device for checking whether a storage device is present or not,
b) the control device has a second device for implementing the function of reading in the parameters and data for operating the control device if a storage device is present, the parameters and data being stored in the storage device, and not carrying out a start-up if a storage device is not present, and
c) the function of not carrying out a start-up when a storage device is not present can be deactivated.

An advantageous embodiment of the invention exists if the control device is an engine management device.

In another embodiment, the control device is preset with default parameters for the first use, and the function of not carrying out a start-up if a storage device is not present is deactivated.

In another embodiment, a method is disclosed comprising:

a) With each activation process the control device checks whether a storage device is present or not,
b) if a storage device is present, the parameters and data stored therein are read into the control device,
c) the control device has a function, which can be deactivated, of not carrying out a start-up if a storage device is not present.

In another embodiment, the control device starts up on first use with preset default parameters if a storage device is not present, the function of not carrying out a start-up if a storage device is not present being deactivated.

A further advantageous embodiment of the method applies if a storage device is present the parameters and data stored therein are read into the control device, and if the function of not carrying out a start-up if a storage device is not present has not yet been activated, the function is activated.

The term "control device" means protection devices, control devices as well as combined protection and control devices, such as are normally connected and used in switchgears connected to electric loads.

The term "insert shaft" generally, and independently of its specific constructional design, means the entry or mounting location of the insert module, e.g. in a switchgear.

The insert shaft may therefore be a supporting frame or similar.

The term "insert module" means a replaceable functional unit of the outgoing circuit that can be withdrawn from the insert shaft. It may be an insert module that can be used if a withdrawable-unit system is applied, which—after it is placed in the insert shaft and the contact set subsequently makes contact—has an electrical connection to the fixed part of the switchgear. Alternatively, the functional unit may be a different, replaceable functional unit, for example a plug-in module that can be used if plug-in technology is applied, in which the contact set automatically makes contact and thereby activates the plug-in module when it is put in place.

BRIEF DESCRIPTION OF THE DRAWINGS

An example embodiment of the invention is described in greater detail below with the help of drawings. In these:

FIG. 1 is a schematic diagram of an embodiment a switchgear with an inventive control device.

DETAILED DESCRIPTION OF THE EXAMPLE EMBODIMENTS

The electrical low-voltage switchgear 1 has a plurality of control devices 3 connected to one another via a bus system 2, for example drive controllers. The bus system 2 is a field bus that is widely used and standardized in automation and production engineering, such as PROFIBUS.

In order to connect to a superordinate control level, for example the control center of the switchgear 1, this switchgear 1 is connected via the bus system 2 to an external control system processor 4 as the bus master for controlling the control devices 3 used as slaves. Process data is exchanged between the control system processor 4 and the respective control devices 3. The process data, in particular, is data for setting, controlling, regulating and/or monitoring the control devices 3. It may also include process parameters or configuration data, in order to effect corresponding changes in the operating behavior of the control devices 3.

The control devices 3 are parameterizable and have a communication interface 5 for communicating with the superordinate control level, in this case the control system processor 4, via the bus system 2, so that they are also designated as "smart" devices. The communication interface 5 of each control device 3 comprises for example a transmitter and/or receiver unit. A great variety of components may be used for this purpose, depending on the transmission technology used.

The control devices 3 are connected in the mounted ("plugged") state to electric loads 6 disposed outside the switchgear 1, which are permanently connected via connection cables 7 to the respective insert shafts 8 of the switchgear 1. The control devices 3 are used, for example, for switching and protecting engines in industrial processes. The control devices 3 are accommodated in insert modules 9 (inserts) in a so-called "withdrawable-unit system". The insert modules 9 can be positioned in suitably provided insert shafts 8 of a switching cabinet 11, depending on drawer type.

For the sake of clarity, FIG. 1 shows only a single insert module 9 with a control device 3 and a single insert shaft 8 of the switching cabinet 11.

If a control device 3 is not parameterized, i.e. has been assigned at least one bus address, the insert module 9 functions only in a limited way or not at all when placed in an insert shaft 8. Only the assignment of a unique communication address makes communication possible within the bus system 2.

The switchgear 1 according to FIG. 1 comprises a plurality of storage devices 12 for storing configuration data and/or operating parameters of the control devices 3 or of the electric load 6.

These storage devices 12 may, but do not have to be, integrated in the insert modules 9. In the exemplary embodiment illustrated they are placed in the insert shafts 8. In other words, in this case it is not the insert modules 9, but the insert shafts 8 that have the storage devices 12. In FIG. 1, for the sake of clarity, the storage device 12 is illustrated as being not in the insert shaft 8, but adjacent to it.

The storage device 12 comprises a communication interface 13 besides the actual storage module 14. The storage module 14 is, for example, a memory card of the type also used in digital cameras, for example.

The communication interface 13 is used for communicating with the control device 3. For this purpose the control device 3 has a further communication interface 10 for communicating with the storage device 12, in addition to the communication interface 5 for communicating with the control system.

Both the communication interface 13 of the storage device 12 and the communication interface 10 of the control device 3 comprise, for example, a transmitter and/or receiver unit, wherein—depending on the transmission technology used—a great variety of components may in turn be used. What matters is that the communication interface 13 of the storage device 12 assigned to the insert shaft 8 is able to communicate with the communication interface 10 of the control device 3 and can transfer or exchange the necessary data. This data transfer may be from the storage device 12 to the control device 3, but may also be from the control device 3 to the storage device 12.

This communication of the control device 3 with the control system processor 4 via the communication interface 5 takes place independently of the communication of the control device 3 with the storage device 12 via the communication interface 10. Moreover, there is no direct communication between the storage device 12 and the control system processor 4, but such communication always takes place via the control device 3.

The configuration data and/or operating parameters stored in the storage device 12 comprise not only operating parameters, in particular functional parameters and protect settings, but also information relevant for communication, in particular address data.

In addition, further identification parameters are stored in the storage device 12, which facilitate the identification of the control device 3 besides or in addition to the address, e.g. details indicating in which field the switchgear 1 or in which module position the respective insert module 9 is placed. This type of additional information is used for example to make details about the control device 3 visible, via the control system, to third parties on the outside, for example service technicians, so that they can carry out an evaluation of the bus address, for example with regard to its module location. As well as the position of the module location, this may also be, for example, the output designations of the connected electric loads 6 (e.g. motors).

An automatic parameterization of the insert module 9 preferably takes place during the placement or activation of the insert module 9 in the insert shaft 8, i.e. in direct temporal connection with the insertion process. This ensures that the parameterization of the control device 3, in particular the allocation of a bus address, and the recognition of the insert module 9, its correct integration into the switchgear field and any subsequent release or non-release of the operation of the insert module 9, takes place promptly and in any case before the activation of the outgoing unit.

Thus the correct addressing and parameterization of a smart control device 3 is guaranteed following the replacement of an insert module 9, wherein the addressing and parameterization take place automatically and with minimum risk of error. Furthermore it is ensured, after an insert module 9 is switched, that the insert shaft 8 is clearly identified, the correct address is set and that the correct parameters are transferred. If a storage device 12 is not present, stored data cannot be read into the control device 3. This would constitute a disrupted state, which would be indicated to the user e.g. by a message "no start-up without storage device" being displayed.

Embodiments of the invention should however facilitate the operation not only of such switchgears 1 with a storage device 12 according to FIG. 1, but also of applications without a storage device 12.

To facilitate both operating modes, the control device 3 is preset in the delivery state with default parameters, which do not lead to dangerous states for the load 6 upon activation, so that at least one start-up without storage device 12 is possible. The control device 3 has a first device for electrical verification during each activation process, to determine whether a storage device 12 is present or not. Furthermore the control device 3 has a second device for implementing the function of reading in the parameters and data for operating the control device 3 if a storage device 12 is present, the parameters and data being stored in the storage device 12, and of not carrying out a start-up if a storage device 12 is not present.

This function of the control device 3, of not carrying out a start-up if a storage device 12 is not present, is deactivated in the delivery state, so that the control device 3 can be operated with its preset default parameters on first use if a storage device 12 is not present. However, if the presence of a storage device 12 were to be detected by the verification, the data stored therein would be automatically read in and at the same time the function "no start-up without storage device" activated. This means that, from that point on, the storage device 12 must be present upon each start-up. The monitoring is activated together with the transfer of data, which may lead to unwanted states in an incorrect insert shaft 8.

By resetting the control device 3, i.e. the engine management system, to the delivery state, the function "no start-up without storage device" can be deactivated again.

An embodiment of the invention thus permits operation with and without a storage device 12. If operated with a storage device 12, it is guaranteed that the presence of the storage device 12 is monitored and the corresponding addresses as well as parameter data are securely loaded into the control device 3. Any operating errors or incorrect address and parameter data in the control device 3, are thereby effectively prevented.

The invention claimed is:

1. A control device for an electric load, the control device being designed as an insert module that is insertable into an insert shaft of a system or a device, the insert shaft being provided with or without with a storage device, the storage device being configured to store at least one of configuration data and operating parameters of the control device or of the electric load connected to the system or device, the control device comprising:
   a first device configured to detect the presence and absence of a storage device in the insert shaft; and
   a second device configured to provide a first function to read in the operating parameters or the configuration data stored in the storage device for operating the control device when a storage device is detected the second device, and further configured to provide a second function to not carry out a start-up when an absence of the storage device is detected, the second function being deactivatable, wherein the control device is preset with default parameters for the first use, and the function of not carrying out a start-up if the storage device is absent is deactivated for only the first use.

2. The control device of claim 1, wherein the control device is an engine management device of an electric motor.

3. The control device of claim 2, wherein the control device is preset with default parameters for the first use and the function of not carrying out a start-up if a storage device is absent is deactivated.

4. A method of operating a control device for an electric load, the control device being an insert module insertable into an insert shaft of a system or a device, wherein the insert shaft being provided with or without with a storage device, the storage device being configured to store at least one of configuration data and operating parameters of the control device or of the electric load, the method comprising:
   detecting, via the control device and with each activation process, the presence and absence of a storage device in the insert shaft; and
   reading the parameters and data stored in the storage device into the control device when the storage device is present, and controlling a function, which is deactivatable, of not carrying out a start-up when the storage device is absent, wherein the control device starts upon a first use with preset default parameters, when the storage device is absent, the function of not carrying out the start-up is deactivated only during the first use of the control device.

5. The method of claim 4, wherein, upon a storage device being present, the default parameters and data stored in the storage device are read into the control device, and if the second function to not carry out the start-up when the storage device is absent, has not yet been activated, the second function is activated.

6. The method of claim 4, wherein, upon a storage device being detected, the default parameters and data stored in the storage device are read into the control device, and if the second function to not carry out the start-up when the storage device is absent, has not yet been activated, the second function is activated.

* * * * *